(12) United States Patent
Keefe et al.

(10) Patent No.: US 8,462,495 B1
(45) Date of Patent: Jun. 11, 2013

(54) DISK DRIVE CARRIER AND DISK DRIVE ENCLOSURE COOLING SYSTEM

(75) Inventors: Stephen J. Keefe, Boylston, MA (US); Joseph L. Brigham, Jr., North Attleborough, MA (US)

(73) Assignee: EMC Corporation, Hopkinton, MA (US)

(*) Notice: Subject to any disclaimer, the term of this patent is extended or adjusted under 35 U.S.C. 154(b) by 309 days.

(21) Appl. No.: 12/568,978

(22) Filed: Sep. 29, 2009

(51) Int. Cl.
*H05K 7/20* (2006.01)

(52) U.S. Cl.
USPC .......... 361/679.46; 361/679.37; 361/678; 361/691; 454/184; 312/223.2

(58) Field of Classification Search
USPC .......... 361/676–678, 679.33–679.39, 679.46, 361/688–693
See application file for complete search history.

(56) References Cited

U.S. PATENT DOCUMENTS

| | | | | |
|---|---|---|---|---|
| 5,940,266 A | * | 8/1999 | Hamilton et al. | 361/695 |
| 5,963,424 A | * | 10/1999 | Hileman et al. | 361/695 |
| 6,042,474 A | * | 3/2000 | Harvey et al. | 454/184 |
| 6,678,157 B1 | * | 1/2004 | Bestwick | 361/695 |
| 7,554,803 B2 | * | 6/2009 | Artman et al. | 361/695 |
| 7,593,223 B2 | * | 9/2009 | Kobayashi | 361/679.5 |
| 7,612,996 B2 | * | 11/2009 | Atkins et al. | 361/679.51 |
| 2001/0028551 A1 | * | 10/2001 | Ota et al. | 361/695 |
| 2005/0168945 A1 | * | 8/2005 | Coglitore | 361/695 |
| 2005/0219809 A1 | * | 10/2005 | Muncaster et al. | 361/685 |
| 2006/0176664 A1 | * | 8/2006 | Casebolt | 361/687 |
| 2006/0292918 A1 | * | 12/2006 | Behl | 439/374 |
| 2007/0034368 A1 | * | 2/2007 | Atkins et al. | 165/247 |
| 2011/0073276 A1 | * | 3/2011 | Huang | 165/47 |
| 2011/0192742 A1 | * | 8/2011 | Xue | 206/320 |

* cited by examiner

*Primary Examiner* — Courtney Smith
(74) *Attorney, Agent, or Firm* — Krishnendu Gupta; Konrad R. Lee

(57) ABSTRACT

A cooling system having a enclosure, a plurality of disk drives stored in the enclosure, a first portion of the disk drives having housings with a first form factor and a second portion of the disk drives having housings with a second form factor smaller than the first form factor, and an air baffle system for directing a flow of air internal the enclosure over portions of the housing of the second portion of the disk drives while at the same time creating a wall to maintain the flow of air over neighboring ones of the first portion of the disk drives (the external flow).

6 Claims, 10 Drawing Sheets

DISK DRIVE CARRIER AND DISK DRIVE ENCLOSURE COOLING SYSTEM

TECHNICAL FIELD

This disclosure relates generally to disk drive carriers and disk drive enclosure cooling systems and more particularly to cooling systems for disk drive enclosures storing disk drives having different form factors.

BACKGROUND

As is known in the art, a disk drive cabinet typically stores disk drives having the same form factor, such as disk drives having either a 3.5 inch form factor or disk drives having a 2.5 inch form factor. A typical disk drive carrier assembly 1 for a 3.5 inch disk drive 2 is shown in FIGS. 1A and 1B. The disk drive carrier assembly 1 includes the 3.5 inch disk drive 2 mounted to a disk drive carrier 3. The disk drive carrier 3 has a handle 4 and air holes 5 and a pair of side arms 6 onto which the disk drive 2 is mounted, as indicated.

As is also known in the art, in such cabinet, a cooling system is provided having fans for driving a flow of air into the air holes 4 and along the disk drives and power supply within the enclosure.

SUMMARY

In accordance with the present disclosure, a disk drive carrier assembly is provided having: a disk drive; a structure having a relatively wide inlet port disposed in a frontal portion of the disk drive carrier for receiving air and having walls tapering in azimuth and elevation downstream of the received air to provide, together with a wall of the disk drive, opposing surfaces of an relatively narrow airflow channel.

In one embodiment, the disk drive carrier has a front plate, such front plate having an aperture therein for receiving the air and for passing the received air to the inlet port.

In one embodiment, the disk drive carrier includes a pair of sidewall members to provide a second pair of opposing surfaces of the channel, said second pair of surfaces being perpendicular to the first-mentioned pair of surfaces providing the channel.

In one embodiment, a spacer is disposed between one of the second pair sidewall members and a sidearm of the disk carrier.

In one embodiment, the inlet port has a predetermined cross sectional area to the received air larger than the cross sectional area of the channel.

In one embodiment, a cooling system is provided having: a enclosure; a plurality of disk drives stored in the enclosure, a first portion of the disk drives having housings with a first form factor and a second portion of the disk drives having housings with a second form factor smaller than the first form factor; and an air baffle system for directing a flow of air internal the enclosure over portions of the housing of the second portion of the disk drives while at the same time creating a wall to maintain the flow of air over neighboring ones of the first portion of the disk drives.

In one embodiment, the air baffle system comprises a plurality of disk drive carriers, each one of the disk drive carriers having the same form factor, a first portion of the disk drive carriers having therein the first portion of the disk drives and a second portion of the disk drive carries having therein the second portion of the disk drives. Each one of the second portion of the disk drive carriers having: a disk drive; a structure having a relatively wide inlet port disposed in a frontal portion of the disk drive carrier for receiving air and having walls tapering in azimuth and elevation downstream of the received air to provide, together with a wall of the disk drive, opposing surfaces of an relatively narrow airflow channel.

With such arrangements, an adaptor disk drive carrier is provided to convert a 3.5" form factor disk drive to a 2.5" form factor disk drive. The adapter disk drive carrier enables 2.5" disk drives to be intermixed in a chassis with 3.5" form factor disk drive carriers while maintaining proper air velocity cooling over neighboring 3.5" drives so that all do not exceed their temperature limits. The air baffle system directs airflow over the 2.5" drive (a flow internal to the disk drive carrier having the 2.5" form factor) while at the same time creating a wall to maintain airflow over neighboring 3.5" drives (an airflow external of the carrier).

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1A:
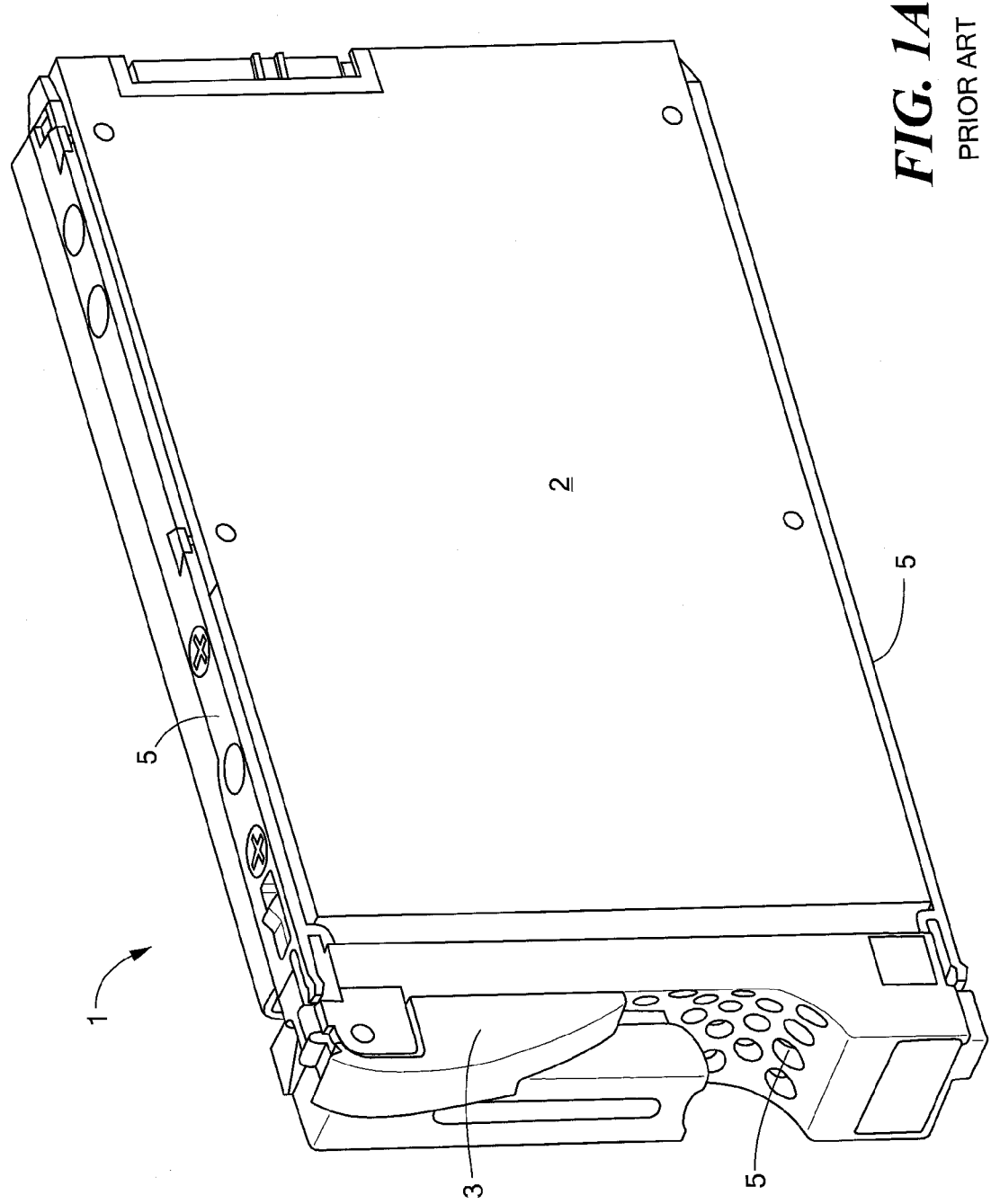
FIG. 1A is a perspective view of a disk drive carrier assembly according to the PRIOR ART.
Figure 1B:
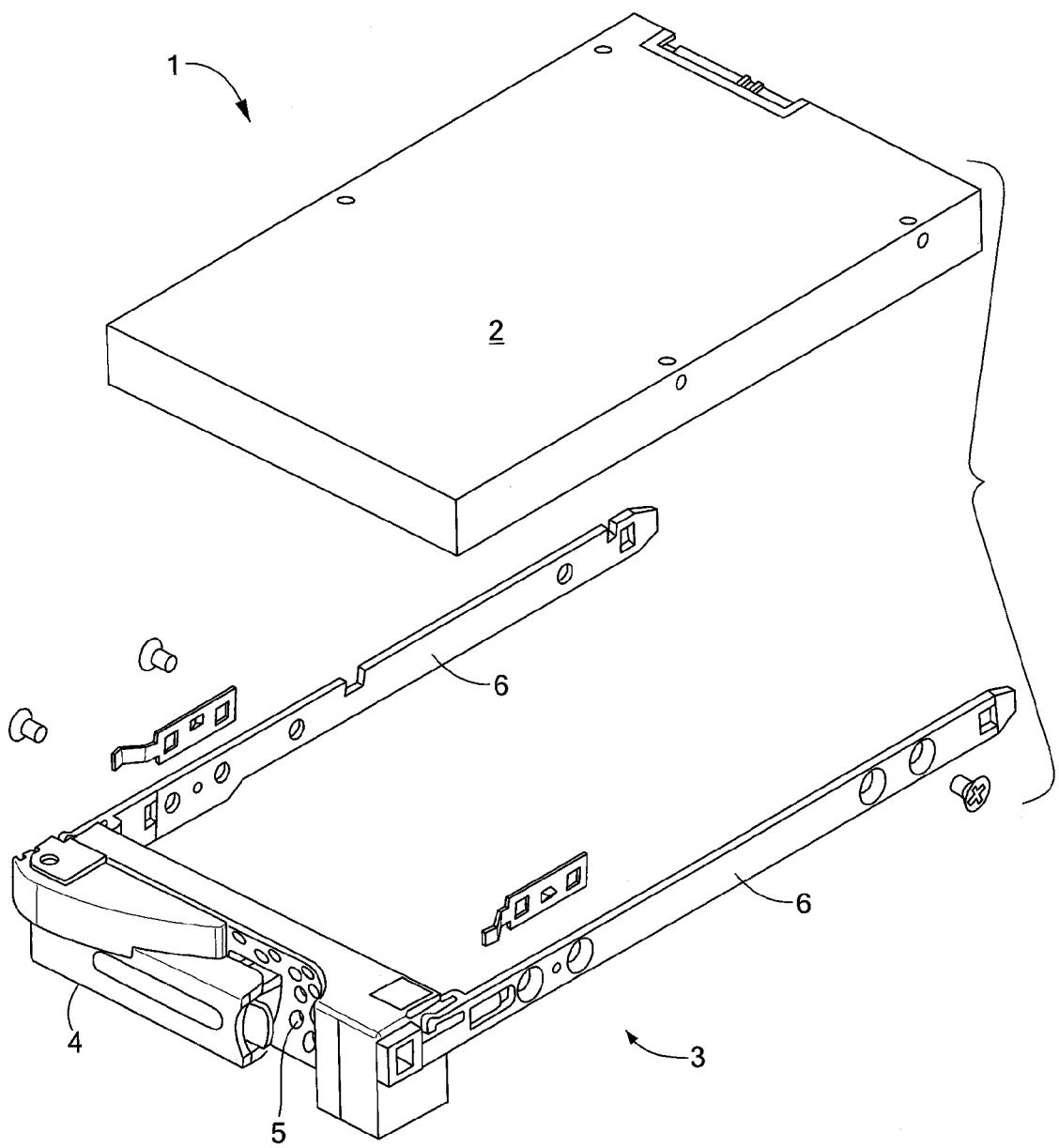
FIG. 1B is a perspective, exploded view of the disk drive carrier assembly of FIG. 1A according to the PRIOR ART.
Figure 2A:
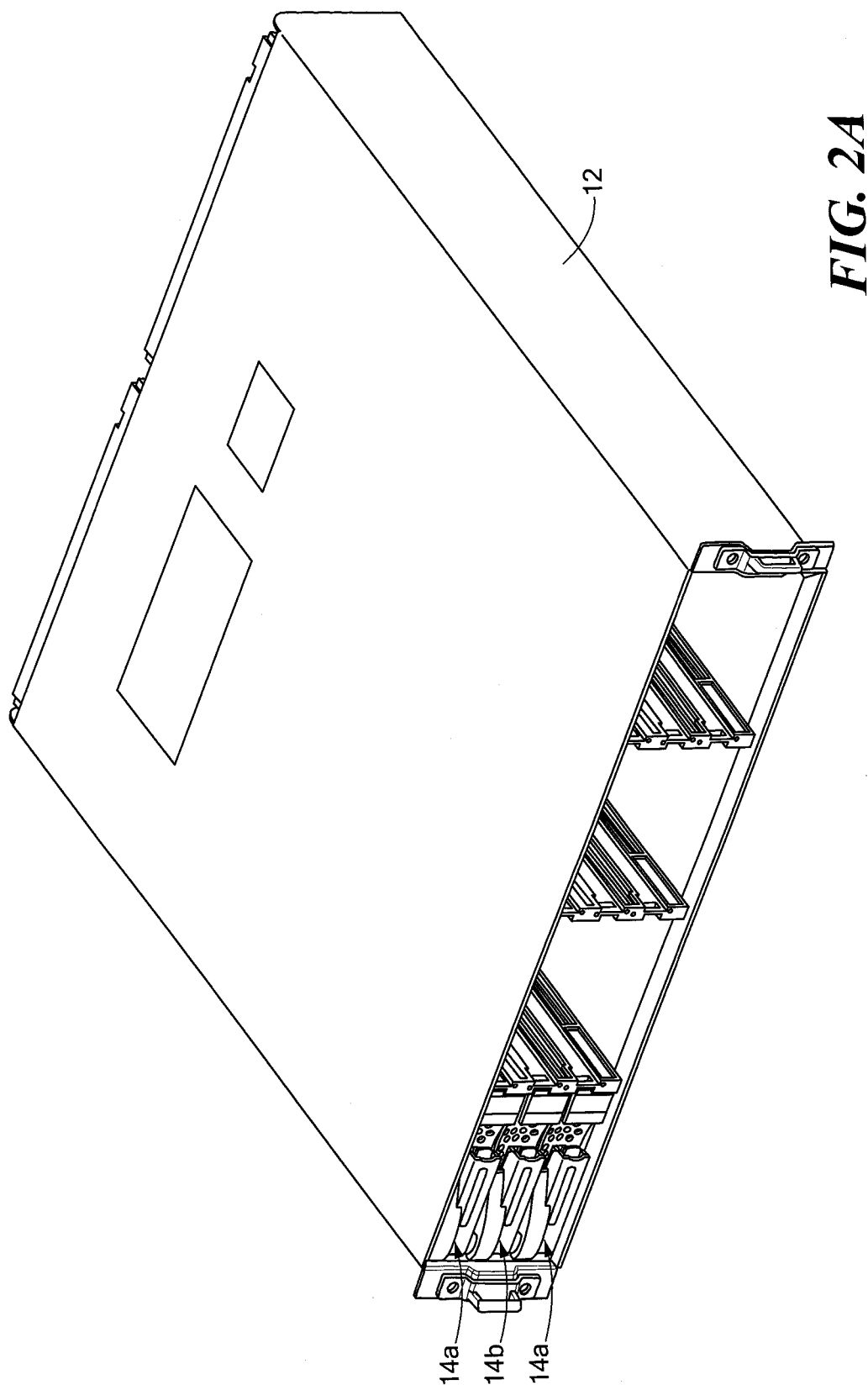
FIG. 2A is a perspective view of a cabinet having partially populated with disk dive carries assemblies of FIGS. 1A and 1B and disk drive array assemblies according to the disclosure, such cabinet having a cooling system according to the disclosure.
Figure 2B:
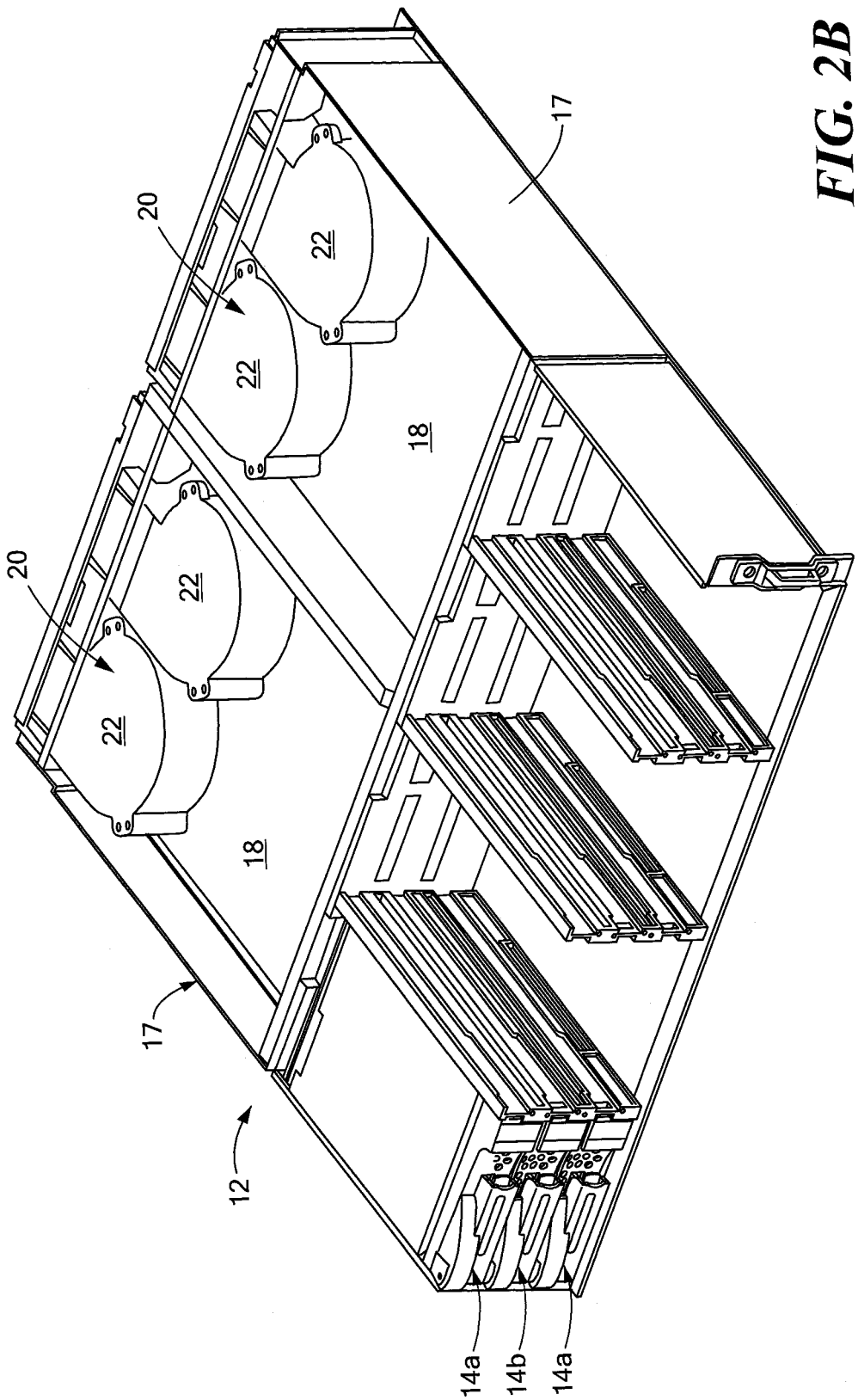
FIG. 2B is a perspective view of a cabinet FIG. 2A with the cover thereof removed.

Referring now to FIGS. 2A and 2B, a cabinet 12 is shown for storing and cooling a plurality of disk drive assemblies, here indicated, for reasons to be described, as disk drive assemblies 14a and 14b, as well as power supplies and fans (to be described) included within the cabinet 12. Here the cabinet 12 has twelve slots adapted to store twelve disk drive assemblies 14a, 14b. Here the cabinet 12 is shown populated with only three vertically positioned disk drive assemblies 14a, 14b. As will become evident, in this example, the upper and lower pair of the three vertically positioned disk drive assemblies 14*a* is the disk drive assembly 1 shown in FIGS. 1A and 1B and each are configured to carry the disk drive 2 (FIGS. 1A and 1B) having a first form factor, here a 3.5 inch disk drive, and the middle one of the three vertically positioned disk drive assemblies 14*b* is configured to carry a disk drive 16 having a smaller than form factor, here a 2.5 inch disk drive, as shown in FIGS. 3A, 3B, 4A and 4B.

Figure 5:
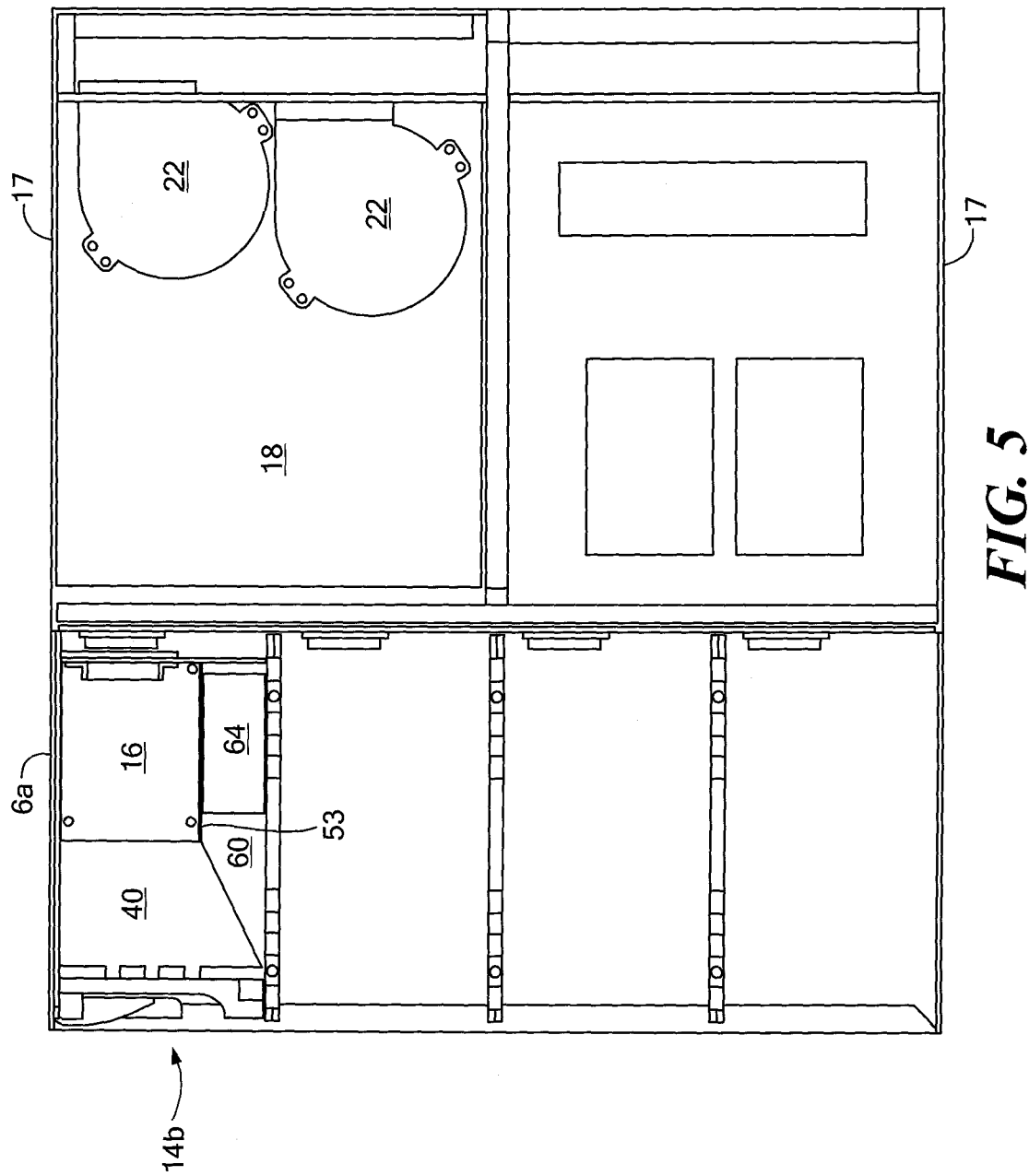
FIG. 5 is a top view of the cabinet of FIG. 2A with several covers thereof removed.

Also stored in the cabinet 12 is a pair of power supply/fan chassis 17, shown more clearly in FIGS. 2B and 5, each one of the chassis 17 having plugged therein six of the twelve disk drives 14*a*, 14*b*. It is noted that each one of the chassis 17 has a power supply section 18 and a fan section 20. Here, each one of the fan sections 20 includes a pair of fans 22, as indicated.

Here, each one of the 3.5 inch disk drives 2 is mounted to a conventional 3.5 inch disk drive carrier assembly 1 as described above in connection with FIGS. 1A and 1B. Here, referring to FIGS. 3A and 3B, the 2.5 inch disk drive 16 is mounted to a disk drive carrier 30. It is first noted that the disk drive carrier 30 has the same handle 4 with the same air holes 5 and the same side arms 6 and the disk drive carrier 3 shown in FIGS. 1A and 1B. Thus, while the disk drives 2 and 16 have different form factors the disk drive carriers 3 and 30 have the same form factor and thus each one of the disk drive carriers 3 and 30 may be inserted into any one of the twelve slots of the cabinet 12 of FIGS. 2A and 2B. Thus, a 2.5 inch disk drive 16 may be replaced with a 3.5 inch disk drive 2 by merely removing the carrier 30 having the 2.5 inch disk drive 16 and replacing it with a carrier 2 having the 2.5 inch disk drive 2, and visa versa.

Figure 3A:
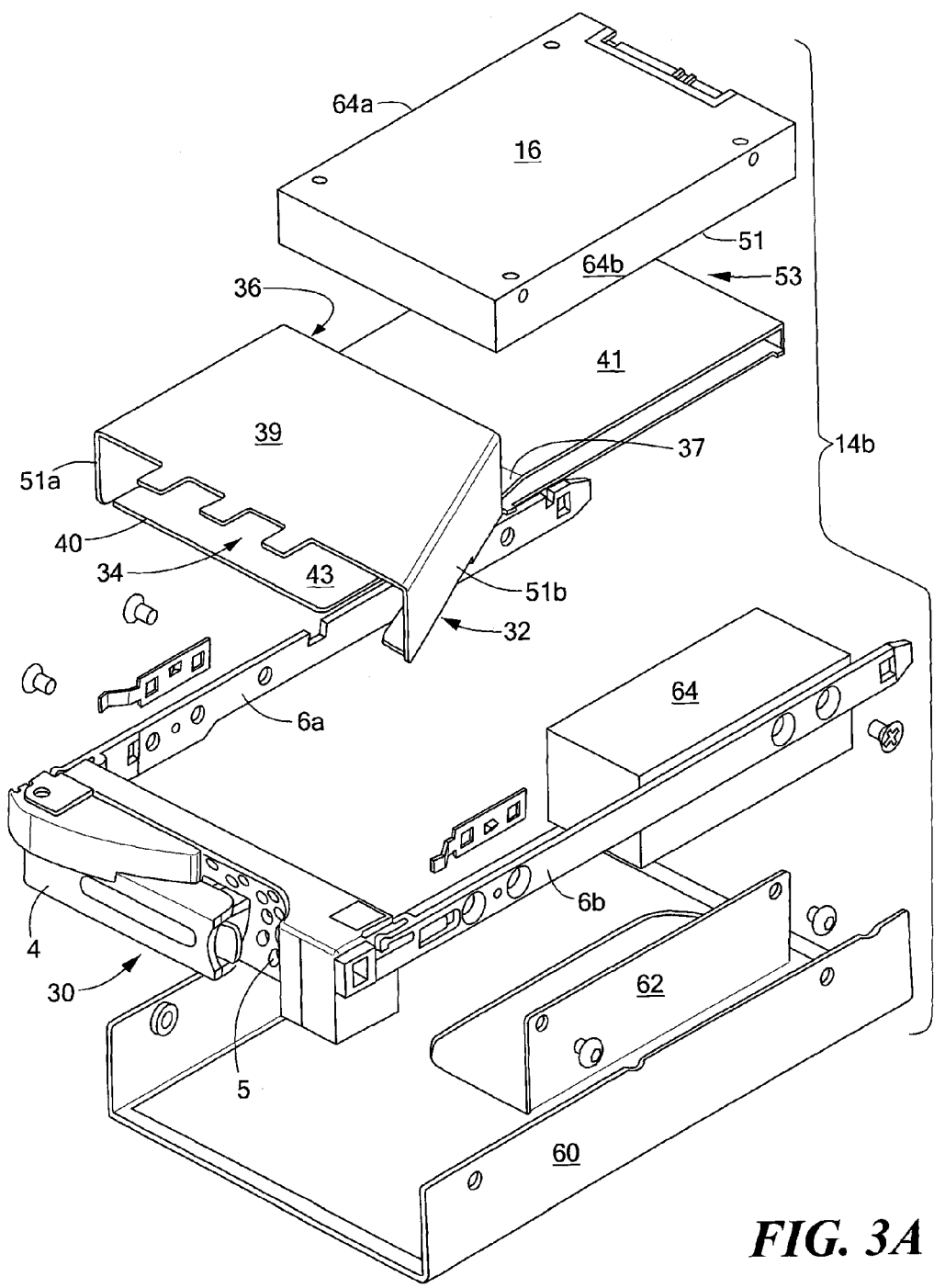
FIG. 3A is a perspective, exploded view of a disk drive carrier assembly according to the disclosure.
Figure 3B:
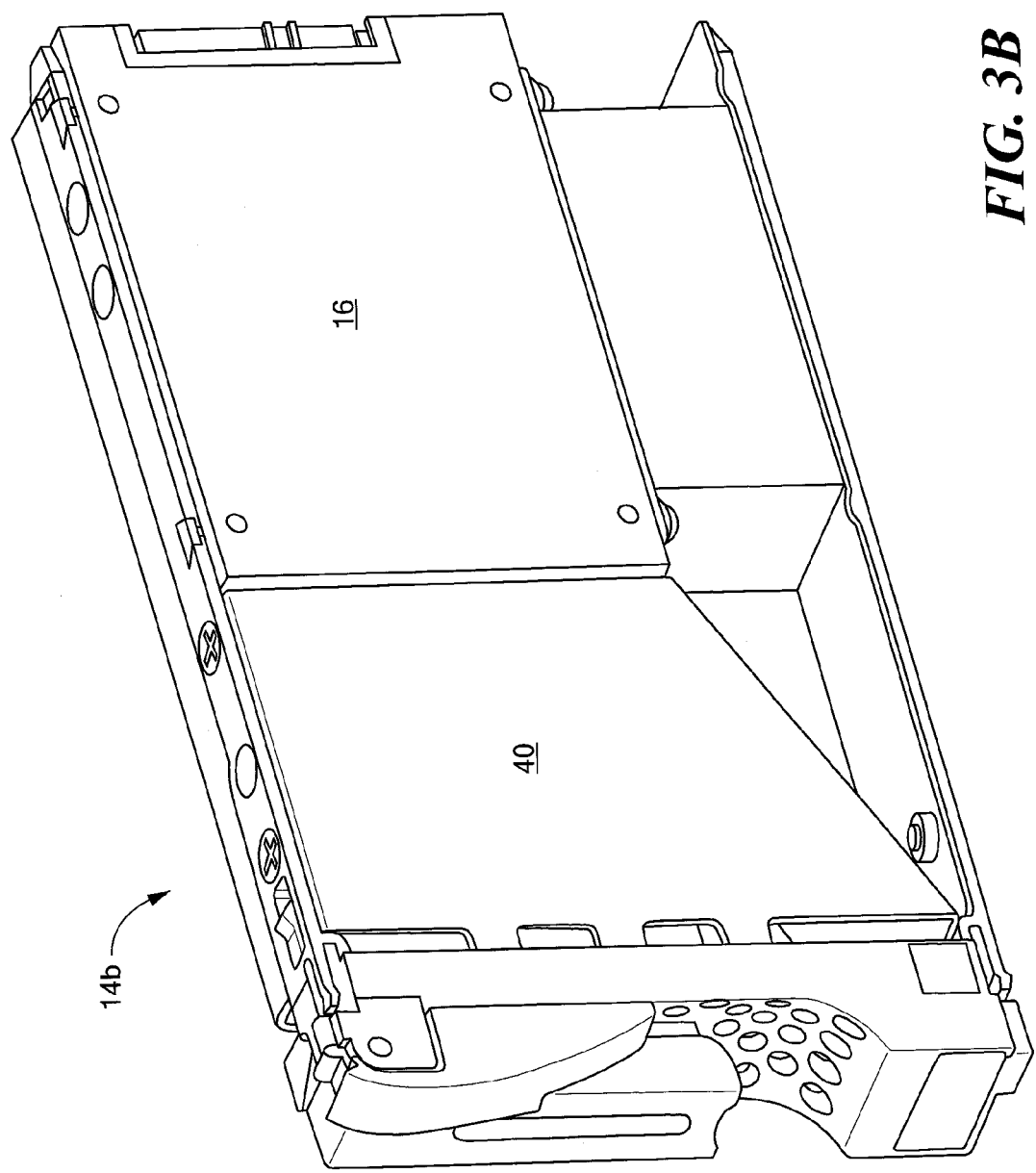
FIG. 3B is a perspective, assembled view of a disk drive carrier assembly of FIG. 3A according to the disclosure.
Figure 4A:
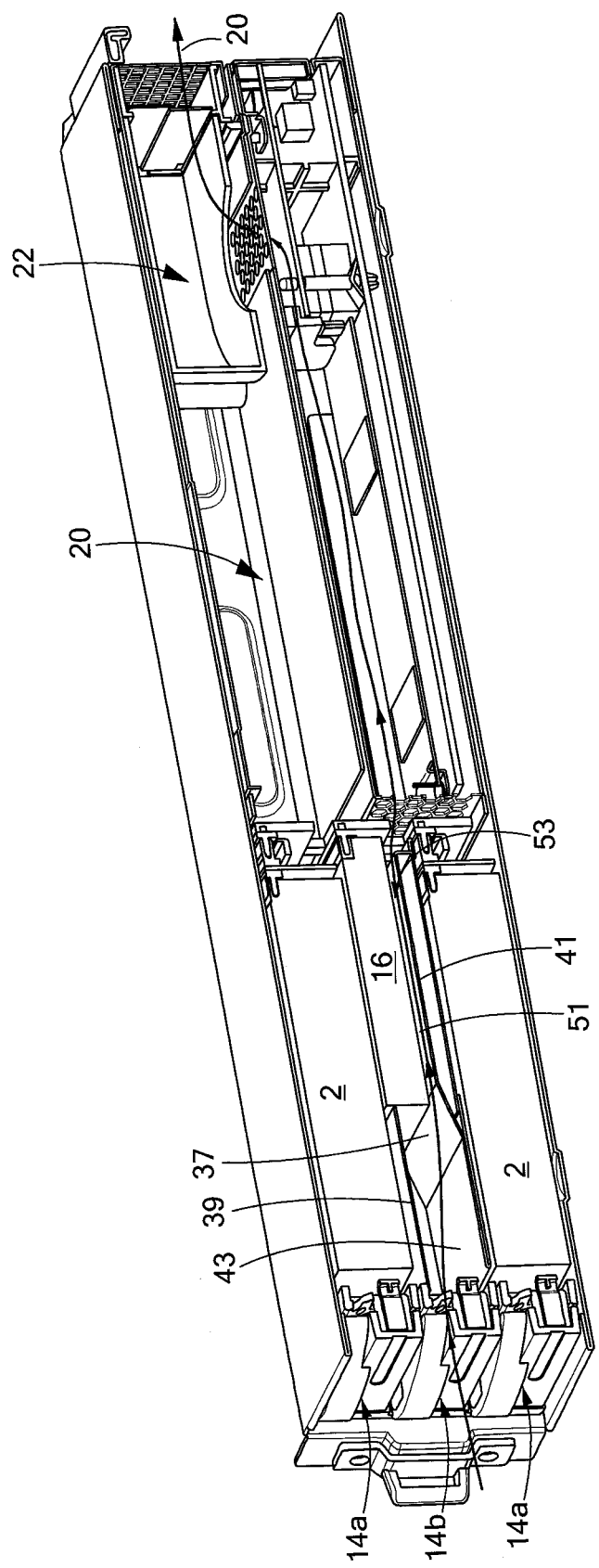
FIG. 4A is a prospective, cross sectional view of the disk drive carrier assembly of FIG. 3A according to the disclosure.
Figure 4B:
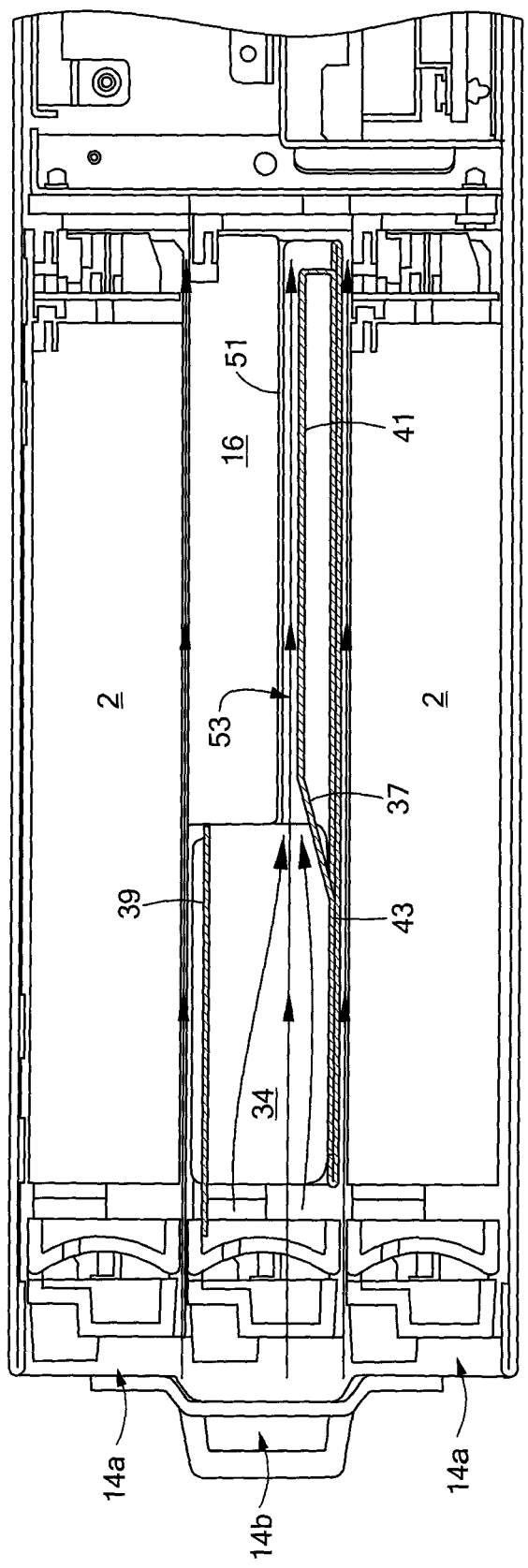
FIG. 4B is a side, cross sectional view of the disk drive carrier assembly of FIG. 3A according to the disclosure.
Figure 6:
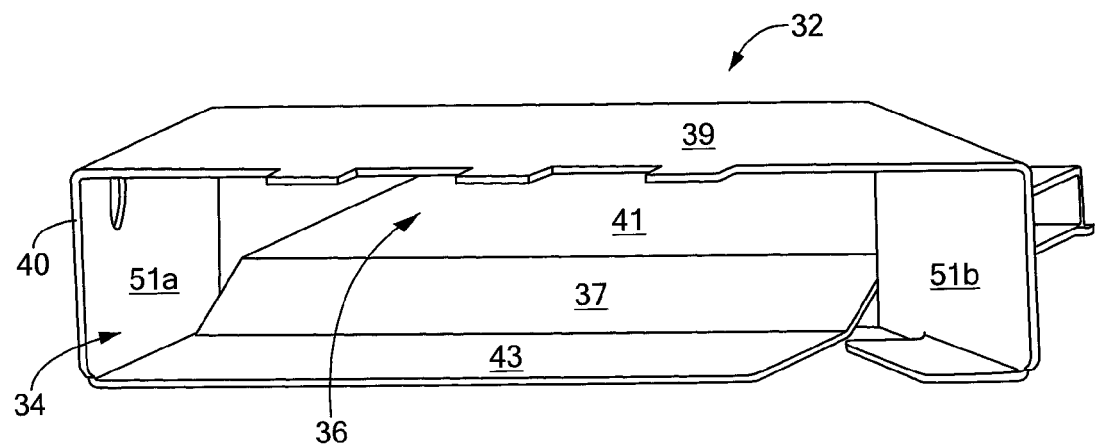
FIG. 6 is a perspective view of a baffle system used in the disk drive assembly of FIG. 2A according to the disclosure.

More particularly, referring to FIGS. 3A and 3B, the assembly 14*b* includes air baffle system 32 for directing a flow of air internal the cabinet 12 over portions of the housing of the 2.5 inch disk drive 16 while at the same time creating a wall to maintain the flow of air over neighboring ones of the 3.5 inch disk drives 2 as indicated by the arrows in FIG. 4B. More particularly, the air baffle system 32 is here a piece of sheet metal 40 (FIGS. 3A and 6) formed to provide a conduit having: (a) forward positioned relatively wide inlet port 34 having a pair of parallel upper and lower walls 39, 43, respectively, and a sidewall 51*a* parallel to the sidearm 6 of the disk drive carrier 30 and an opposite sidewall 51*b* which tapers in azimuth inwardly as indicated in a frontal portion of the disk drive carrier 30 for receiving the first portion of the airflow driven by the fans 22 (FIG. 5) through the air holes; (b) a mid-section (or transition section) 37 formed by tapering the lower wall 43 upwardly from front to rear; and (c) wherein the tapered lower wall 37 terminates in the rear section to provide the rear section with a bottom surface 41 elevated from the bottom wall 43 of the inlet port 34.

Figure 7:
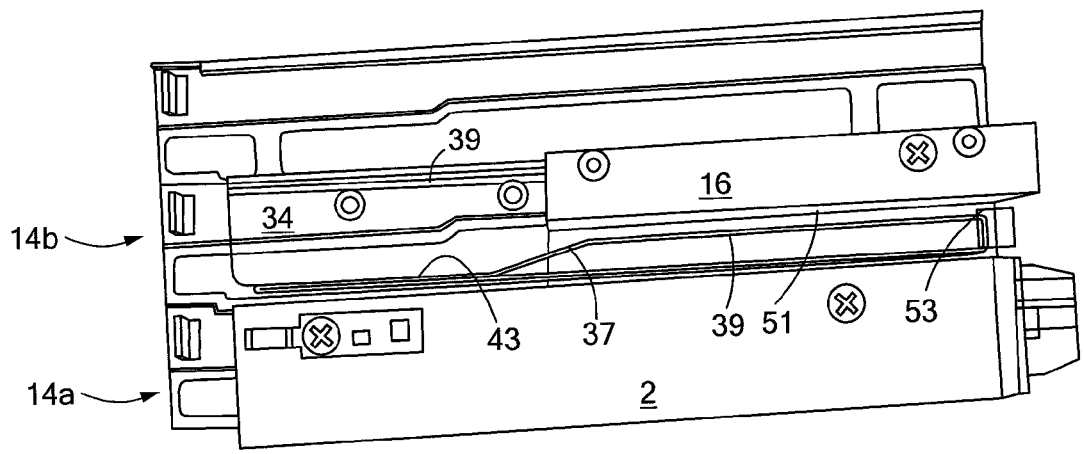
FIG. 7 is a side view of a pair of disk drive assemblies mounted within the cabinet of FIG. 2A, one of the disk drive assemblies being the disk drive assembly of FIG. 3B according to the disclosure and the other disk drive assembly being the disk drive assembly of FIG. 1A.

Referring also to FIGS. 4A, 4B and 7, it is noted that the elevated wall 41 (i.e., elevated with respect to wall 43) of the rear section and the bottom surface 51 of the disk drive 16 have a gap between them to form an relatively narrow air channel 53 which receives the airflow from the front portion or inlet port. The air baffle system 32 (FIG. 4B) directs a portion of air flow (represented by arrow 18 in FIG. 4B) entering the enclosure 12 over the disk drive 16 (represented by arrow 20) while at the same time creating a wall 41 to maintain a different portion of the air flow entering the enclosure over a adjacent ones of the disk drives 2.

Thus, the baffle system 32 formed by the sheet metal 40 is a structure having a relatively wide inlet port disposed in a frontal portion of the disk drive carrier for receiving air and having walls tapering in azimuth and elevation downstream of the received air to provide, together with a wall 51 of the disk drive 16, opposing surfaces of an relatively narrow airflow channel 53.

It is noted that the air passes through the channel 53. It is further noted that the cross sectional area of the channel 53 as seen by the flow of air entering the channel 53 is smaller than the cross sectional area seen by the air passing through the conduit formed by the frontal, inlet port 34 of the baffle system 32. Thus, as shown in FIGS. 4B and 7, air entering the air holes in the handle passes from the inlet port 34 having a relatively large cross sectional area passes via transition region 37 to the relatively narrow channel 53 having a smaller cross sectional air to the air flow. Thus, the velocity of the air in the channel 53 will be greater than the velocity of the air in inlet port 34.

Referring again to FIG. 3A, the disk drive carrier 30 includes a steel plate 60 having a vertically extending section 62. One side 64*a* of the disk drive 16 is screwed into one of the sidearms 6 (herein designated as sidearm 6*a*) of the disk drive carrier 30 and the opposite side 64*b* of the disk drive 16 is screwed into the vertically extending section 62. Thus, the side arm 6*a* and the vertically extending section 62 provide side walls for the channels 53 (FIG. 5) A spacer 64 is affixed by any suitable adhesive to the plate 60 and is used as part of the airflow system.

Finally, it is noted from FIG. 4A that the air indicated by the arrow 60 passes though the power supply section 20 via air holes in vertical partitions and then flows outside the chassis, such air being driven by the fans 22 as indicated above A number of embodiments of the disclosure have been described. Nevertheless, it will be understood that various modifications may be made without departing from the spirit and scope of the disclosure. Accordingly, other embodiments are within the scope of the following claims.

What is claimed is:

1. A cooling system, comprising:
   an enclosure;
   a plurality of disk drives stored in the enclosure, a first portion of the disk drives having a first form factor and a second portion of the disk drives having a second form factor smaller than the first form factor;
   an air baffle system for directing a portion of air flow entering the enclosure over the second portion of the disk drives while at the same time creating a wall to maintain a different portion of the air flow entering the enclosure over an adjacent one of the first portion of the disk drives; the air baffling system having an inlet port disposed in a frontal portion of one of the disk drives for receiving air and having walls tapering in azimuth and elevation downstream of the received air to provide, together with a wall of the disk drive, opposing surfaces of an airflow channel; and wherein the inlet port is wider than the airflow channel.

2. A cooling system, comprising:
   an enclosure;
   a plurality of disk drives stored in the enclosure, a first portion of the disk drives having a first form factor and a second portion of the disk drives having a second form factor smaller than the first form factor;
   an air baffle system for directing a portion of air flow entering the enclosure over the second portion of the disk drives while at the same time creating a wall to maintain a different portion of the air flow entering the enclosure over an adjacent one of the first portion of the disk drives wherein the air baffle system comprises a plurality of disk drive carriers, each one of the disk drive carriers having the same form factor, a first portion of the disk drive carriers having therein the first portion of the disk drives and a second portion of the disk drive carriers having therein the second portion of the disk drives, each one of the second portion of the disk drive carriers having:
an inlet port disposed in a frontal portion of the disk drive carrier for receiving air and having walls tapering in azimuth and elevation downstream of the received air to provide, together with a wall of one of the disk drives carried by the disk drive carrier, opposing surfaces of an airflow channel; and
wherein the inlet port is wider than the airflow channel.

3. The assembly recited in claim 2, wherein the carrier includes a pair of sidewall members to provide a second pair of opposing surfaces of the channel, said second pair of surfaces being perpendicular to the first-mentioned pair of surfaces providing the channel.

4. The assembly recited in claim 3 including a spacer disposed between one of the second pair sidewall members and a sidearm of the disk drive carrier.

5. The assembly recited in claim 4 wherein the inlet port has a predetermined cross sectional area to the received air larger than the cross sectional area of the channel.

6. A cooling system, comprising:
an enclosure;
a plurality of disk drive carriers, each one of the disk drive carriers having the same form factor, a first portion of the disk drive carriers having therein a first portion of the disk drives and a second portion of the disk drive carriers having therein a second portion of the disk drives, the first portion of the disk drives having a form factor smaller than a form factor of a second portion of the disk drives;
wherein each one of the first portion of the disk drive carriers comprises:
a conduit having an inlet port in a frontal portion of the disk drive carrier for receiving a first portion of the airflow entering the enclosure and having walls tapering in azimuth and elevation and terminating in an outlet port disposed forward of a disk drive mounted to the disk drive carrier;
wherein the inlet port is wider than the outlet port;
wherein the one of the portion of disk drives therein is mounted to the rearward portion of the disk drive carrier, inner surfaces of the tapered sidewalls providing an air deflector to direct the first portion of the airflow and entering the inlet port through the conduit and exiting the outlet port towards the disk drive therein; and
wherein an outer surface of one of the sidewalls passes a second portion of the airflow entering the enclosure past an adjacent one of the second portion of the disk drive carriers.

* * * * *